(12) United States Patent
Hendry

(10) Patent No.: US 12,363,333 B2
(45) Date of Patent: Jul. 15, 2025

(54) IMAGE ENCODING/DECODING METHOD AND APPARATUS BASED ON SUBLAYER LEVEL INFORMATION, AND RECORDING MEDIUM STORING BITSTREAM

(71) Applicant: LG ELECTRONICS INC., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 18/008,900

(22) PCT Filed: Jun. 8, 2021

(86) PCT No.: PCT/KR2021/007124
§ 371 (c)(1),
(2) Date: Apr. 24, 2023

(87) PCT Pub. No.: WO2021/251718
PCT Pub. Date: Dec. 16, 2021

(65) Prior Publication Data
US 2023/0254498 A1    Aug. 10, 2023

Related U.S. Application Data

(60) Provisional application No. 63/037,509, filed on Jun. 10, 2020.

(51) Int. Cl.
*H04N 19/46* (2014.01)
*H04N 19/169* (2014.01)

(52) U.S. Cl.
CPC ......... *H04N 19/46* (2014.11); *H04N 19/1883* (2014.11)

(58) Field of Classification Search
CPC .. H04N 19/1883; H04N 19/46; H04N 19/184; H04N 19/187; H04N 19/30; H04N 19/31; H04N 19/70
(Continued)

(56) References Cited

U.S. PATENT DOCUMENTS

| 2012/0189058 | A1* | 7/2012 | Chen | H04N 19/174 |
| | | | | 375/E7.243 |
| 2022/0394304 | A1* | 12/2022 | Deng | H04N 19/184 |
| 2023/0016439 | A1* | 1/2023 | Deshpande | H04N 19/70 |

FOREIGN PATENT DOCUMENTS

| JP | 2015195543 A | * | 11/2015 | H04N 19/30 |
| KR | 1020140122200 A | | 10/2014 | |

(Continued)

OTHER PUBLICATIONS

Benjamin Bross, et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020. JVET-R2001-vA.

*Primary Examiner* — Behrooz M Senfi
(74) *Attorney, Agent, or Firm* — Bryan Cave Leighton Paisner LLP

(57) ABSTRACT

An image encoding/decoding method and apparatus is provided. The image decoding method comprises obtaining, from a bitstream, a first flag specifying whether sublayer level information is present for each of one or more sublayers in a current layer, and obtaining, from the bitstream, the sublayer level information based on the first flag. The first flag may be obtained in a descending order of temporal identifier values for the one or more sublayers.

10 Claims, 11 Drawing Sheets

(58) Field of Classification Search
USPC .................................................. 375/240.26
See application file for complete search history.

(56) References Cited

FOREIGN PATENT DOCUMENTS

| | | | | | |
|---|---|---|---|---|---|
| KR | 1020160105793 | A | | 9/2016 | |
| KR | 102006531 | B | | 7/2019 | |
| KR | 102101535 | B | | 4/2020 | |
| WO | WO-2015140401 | A1 | * | 9/2015 | ........... H04N 19/172 |
| WO | WO-2017195582 | A1 | * | 11/2017 | ........... H04N 19/188 |
| WO | WO-2021022267 | A2 | * | 2/2021 | ........... H04N 19/105 |

* cited by examiner

FIG. 9

| video_parameter_set_rbsp( ) { | Descriptor |
|---|---|
|   vps_video_parameter_set_id | u(4) |
|   vps_max_layers_minus1 | u(6) |
|   vps_max_sublayers_minus1 | u(3) |
|   ... | |
|   vps_num_ptls_minus1 | u(8) |
|   for( i = 0; i <= vps_num_ptls_minus1; i++ ) { | |
|     if( i > 0 ) | |
|       vps_pt_present_flag[ i ] | u(1) |
|     if( !vps_all_layers_same_num_sublayers_flag ) | |
|       vps_ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( vps_pt_present_flag[ i ], vps_ptl_max_temporal_id[ i ] ) | |
|   for( i = 0; i < TotalNumOlss; i++ ) | |
|     if( vps_num_ptls_minus1 > 0 && vps_num_ptls_minus1 + 1 != TotalNumOlss ) | |
|       vps_ols_ptl_idx[ i ] | u(8) |
|   ... | |
| } | |

FIG. 10

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   ... | |
| } | |

FIG. 11

| profile_tier_level( profileTierPresentFlag, maxNumSubLayersMinus1 ) { | Descriptor |
|---|---|
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |
|     ptl_sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( ptl_sublayer_level_present_flag[ i ] ) | |
|       sublayer_level_idc[ i ] | u(8) |
| } | |

FIG. 12

| profile_tier_level( profileTierPresentFlag, maxNumSubLayersMinus1 ) { | Descriptor |
|---|---|
|   ... | |
|   for( i = maxNumSubLayersMinus1 − 1; i >= 0; i− − ) | |
|     ptl_sublayer_level_present_flag[ i ] | u(1) |
|   while( !byte_aligned( ) ) | |
|     ptl_alignment_zero_bit | f(1) |
|   for( i = maxNumSubLayersMinus1 − 1; i >= 0; i− − ) | |
|     if( ptl_sublayer_level_present_flag[ i ] ) | |
|       sublayer_level_idc[ i ] | u(8) |
| } | |

IMAGE ENCODING/DECODING METHOD AND APPARATUS BASED ON SUBLAYER LEVEL INFORMATION, AND RECORDING MEDIUM STORING BITSTREAM

CROSS-REFERENCE TO RELATED APPLICATION

This application is the National Stage filing under 35 U.S.C. 371 of International Application No. PCT/KR2021/007124, filed Jun. 8, 2021, which claims priority to and the benefit of U.S. Provisional Application No. 63/037,509, filed Jun. 10, 2020, the disclosure of which is incorporated herein by reference in its entirety.

TECHNICAL FIELD

The present disclosure relates to an image encoding/decoding method and apparatus and a recording medium storing a bitstream, and, more particularly, to an image encoding/decoding method and apparatus based on sublayer level information, and a recording medium for storing bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide an image encoding/decoding method and apparatus based on a sublayer level information flag encoded/decoded in a descending order of temporal identifier values.

Another object of the present disclosure is to provide an image encoding/decoding method and apparatus based on sublayer level information encoded/decoded in a descending order of temporal identifier values.

Another object of the present disclosure is to provide an image encoding/decoding method and apparatus in which a signaling/parsing process and inference process of sublayer level information are performed in the same loop.

Another object of the present disclosure is to provide a non-transitory recording medium storing a bitstream generated by an image encoding method or apparatus according to the present disclosure.

Another object of the present disclosure is to provide a non-transitory recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

An image decoding method according to an aspect of the present disclosure comprises obtaining, from a bitstream, a first flag specifying whether sublayer level information is present for each of one or more sublayers in a current layer, and obtaining, from the bitstream, the sublayer level information based on the first flag. The first flag may be obtained in a descending order of temporal identifier values for the one or more sublayers.

An image decoding apparatus according to another aspect of the present disclosure comprises a memory and at least one processor. The at least one processor may obtain, from a bitstream, a first flag specifying whether sublayer level information is present for each of one or more sublayers in a current layer, and obtain, from the bitstream, the sublayer level information based on the first flag. The first flag may be obtained in a descending order of temporal identifier values for the one or more sublayers.

An image encoding method according to another aspect of the present disclosure comprises encoding a first flag specifying whether sublayer level information is present for each of one or more sublayers in a current layer, and encoding the sublayer level information based on the first flag. The first flag may be encoded in a descending order of temporal identifier values for the one or more sublayers.

In addition, a computer-readable recording medium according to another aspect of the present disclosure may store the bitstream generated by the image encoding apparatus or the image encoding method of the present disclosure.

In a transmission method according to another aspect of the present disclosure, a bitstream generated by an image encoding method or an image encoding apparatus of the present disclosure may be transmitted.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

According to the present disclosure, it is possible to provide an image encoding/decoding method and apparatus based on a sublayer level information flag encoded/decoded in a descending order of temporal identifier values.

According to the present disclosure, it is possible to provide an image encoding/decoding method and apparatus based on sublayer level information encoded/decoded in a descending order of temporal identifier values.

According to the present disclosure, it is possible to provide an image encoding/decoding method and apparatus in which a signaling/parsing process and inference process of sublayer level information are performed in the same loop.

Also, according to the present disclosure, it is possible to provide a computer-readable recording medium storing a bitstream generated by an image encoding method or apparatus according to the present disclosure.

Also, according to the present disclosure, it is possible to provide a computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 9 is a view illustrating an example of VPS syntax including PTL information.

FIG. 10 is a view illustrating an example of SPS syntax including PTL information.

FIG. 11 is a view illustrating an example of profile_tier_level(profileTierPresentFlag, maxNumSubLayersMinus1) syntax including PTL information.

FIG. 12 is a view illustrating profile_tier_level(profileTierPresentFlag, maxNumSubLayersMinus1) syntax according to an embodiment of the present disclosure.

DETAILED DESCRIPTION

Figure 1:
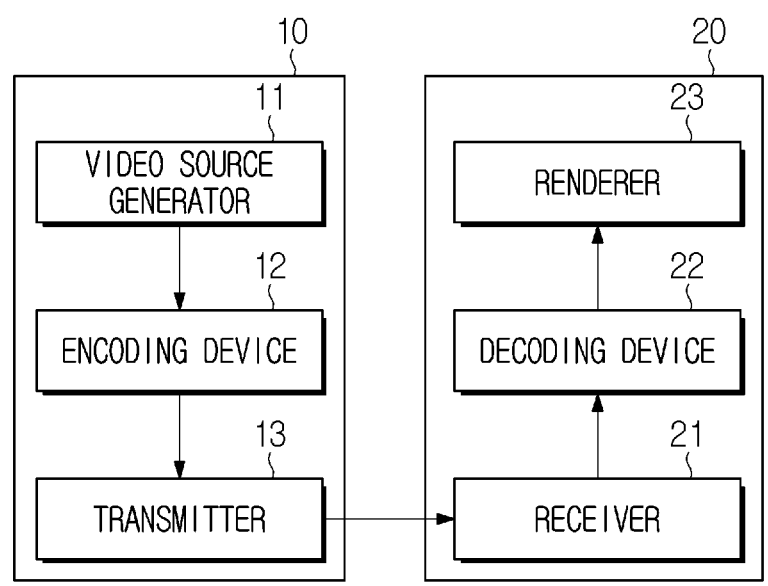
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view illustrating a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
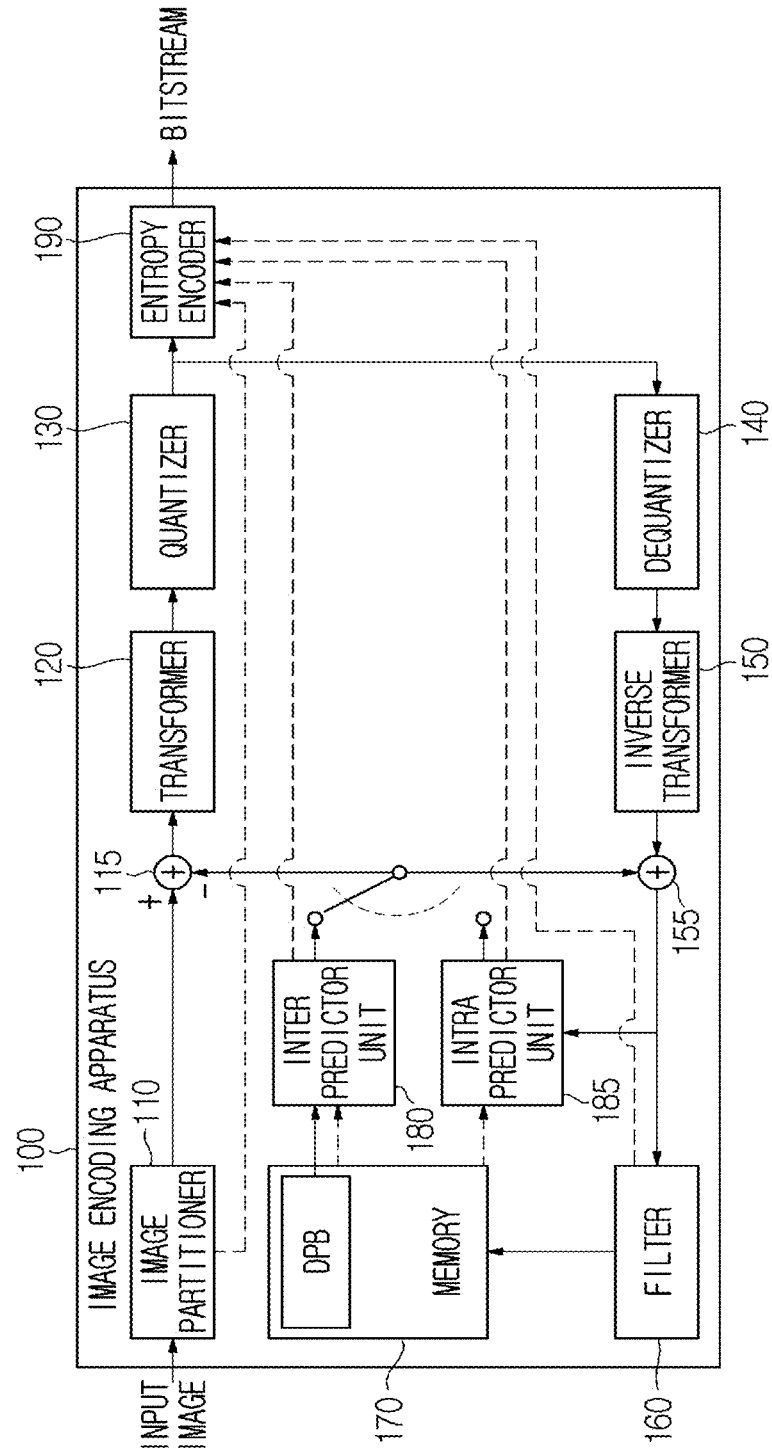
FIG. 2 is a view schematically illustrating an image encoding apparatus, to which an embodiment of the present disclosure is applicable.

FIG. 2 is a view schematically illustrating an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
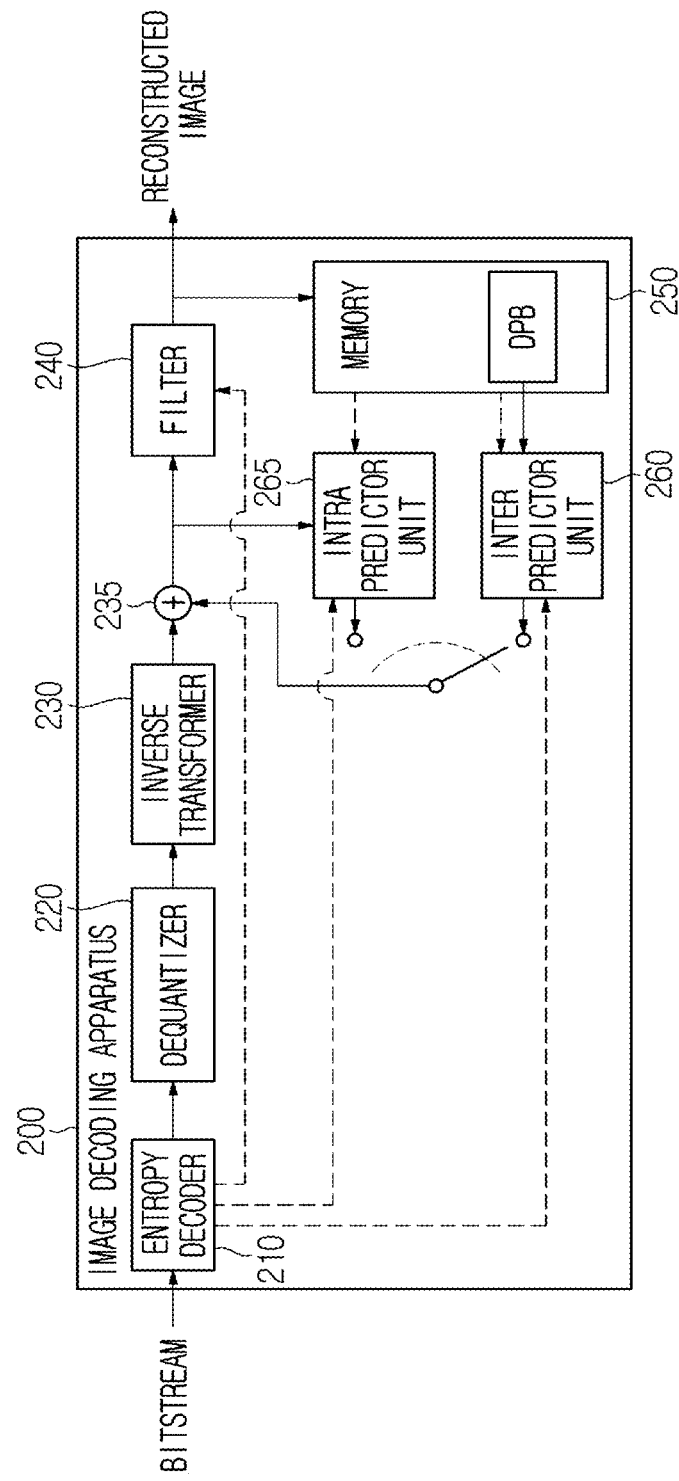
FIG. 3 is a view schematically illustrating an image decoding apparatus, to which an embodiment of the present disclosure is applicable.

FIG. 3 is a view schematically illustrating an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Example of Coding Layer Structure

A coded video/image according to the present disclosure may be processed, for example, according to a coding layer and structure which will be described below.

Figure 4:
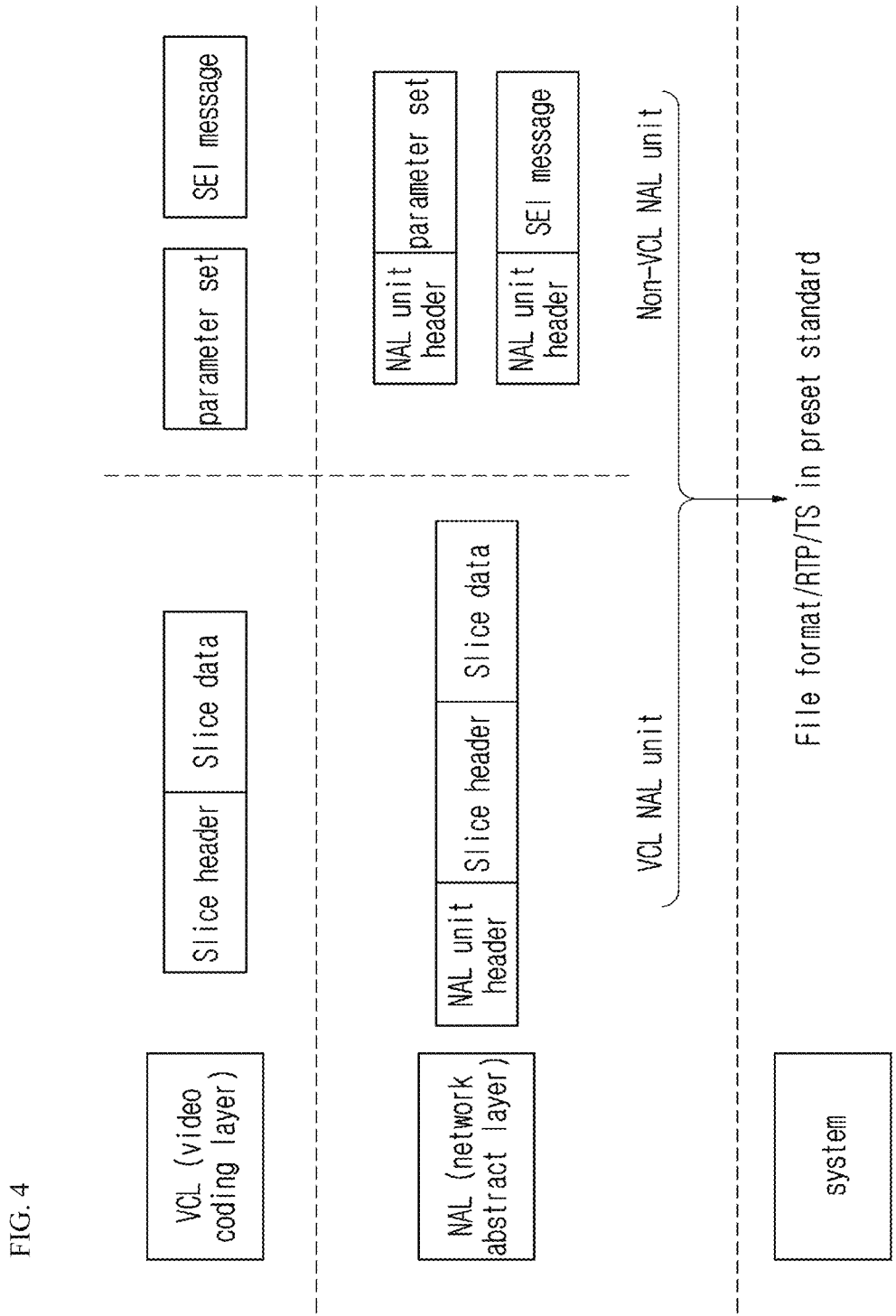
FIG. 4 is a view illustrating an example of a layer structure for a coded image/video.

FIG. 4 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 4, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit type (NUT): Type for NAL unit including DCI VPS (Video Parameter Set) NAL unit: Type for NAL unit including VPS SPS (Sequence Parameter Set) NAL unit: Type for NAL unit including SPS PPS (Picture Parameter Set) NAL unit: Type for NAL unit including PPS APS (Adaptation Parameter Set) NAL unit: Type for NAL unit including APS PH (Picture header) NAL unit: Type for NAL unit including a picture header The above-described NAL unit types may have syntax information for a NAL unit type, and the syntax information may be stored in a NAL unit header and signaled. For example, the syntax information may be nal_unit_type, and the NAL unit types may be specified using nal_unit_type values.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 5:
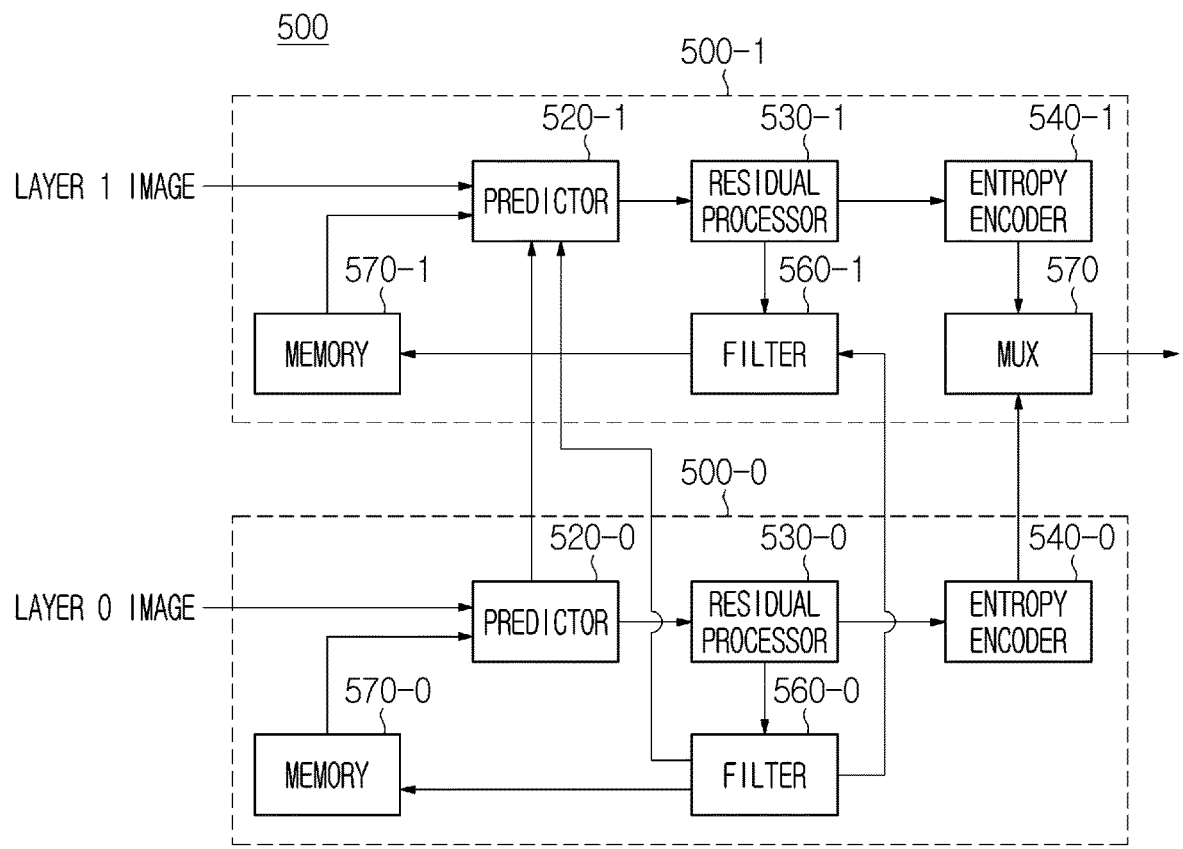
FIG. 5 is a schematic block diagram of a multi-layer encoding apparatus, to which embodiment(s) of the present disclosure is applicable, and, in which encoding of a multi-layer video/image signal is performed.

FIG. 5 is a schematic block diagram of a multi-layer encoding apparatus 2100, to which embodiment(s) of the present disclosure is applicable, and, in which encoding of a multi-layer video/image signal is performed.

The multi-layer encoding apparatus 500 of FIG. 5 may include the encoding apparatus of FIG. 2. Compared to FIG. 2, the image partitioner 110 and the adder 155 are not shown in the multi-layer encoding apparatus 500 of FIG. 5, the multi-layer encoding apparatus 500 may include the image partitioner 110 and the adder 155. In this case, the image partitioner 110 and the adder 155 may be included in unit of layer. Hereinafter, multi-layer based prediction will be focused upon in the description of FIG. 5. For example, in addition to the following description, the multi-layer encoding apparatus 500 may include the technical idea of the encoding apparatus described above with reference to FIG. 2.

For convenience of description, a multi-layer structure consisting of two layers is shown in FIG. 5. However, the embodiments of the present disclosure are not limited to two layers and the multi-layer structure, to which the embodiment of the present disclosure is applied, may include two or more layers.

Referring to FIG. 5, the encoding apparatus 500 includes an encoder 500-1 of layer 1 and an encoder 500-0 of layer 0. Layer 0 may be a base layer, a reference layer or a lower layer, and layer 1 may be an enhancement layer, a current layer or a higher layer.

The encoder 500-1 of layer 1 may include a predictor 520-1, a residual processor 530-1, a filter 560-1, a memory 570-1, an entropy encoder 540-1 and a multiplexer (MUX) 570-. In an embodiment, the MUX may be included as an external component.

The encoder 500-0 of layer 0 may include a predictor 520-0, a residual processor 530-0, a filter 560-0, a memory 570-0 and an entropy encoder 540-0.

The predictors 520-0 and 520-1 may perform prediction with respect to input images based on various prediction schemes as described above. For example, the predictors 520-0 and 520-1 may perform inter prediction and intra prediction. The predictors 520-0 and 520-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 520-0 and 520-1 may generate a predicted block based on the reference block.

In addition, the predictor 520-1 may perform prediction for layer 1 using information on layer 0. In the present disclosure, a method of predicting information on a current layer using information on another layer is referred to as inter-layer prediction, for convenience of description.

Information on a current layer predicted using information on another layer (that is, predicted by inter-layer prediction) may be at least one of texture, motion information, unit information or a predetermined parameter (e.g., a filtering parameter, etc.).

In addition, information on another layer used for prediction of the current layer (that is, used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 520-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 520-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 520-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 520-1 may use only a sample vale of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 220-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 520-1 may use a motion vector specified by the inter-layer reference picture as a motion vector predictor for deriving the motion vector of the current block. In addition, the predictor 520-1 may use a motion vector specified by the inter-layer reference picture as the motion vector of the current block.

When both the sample value and motion information of the inter-layer reference picture are used, the predictor 520-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 6:
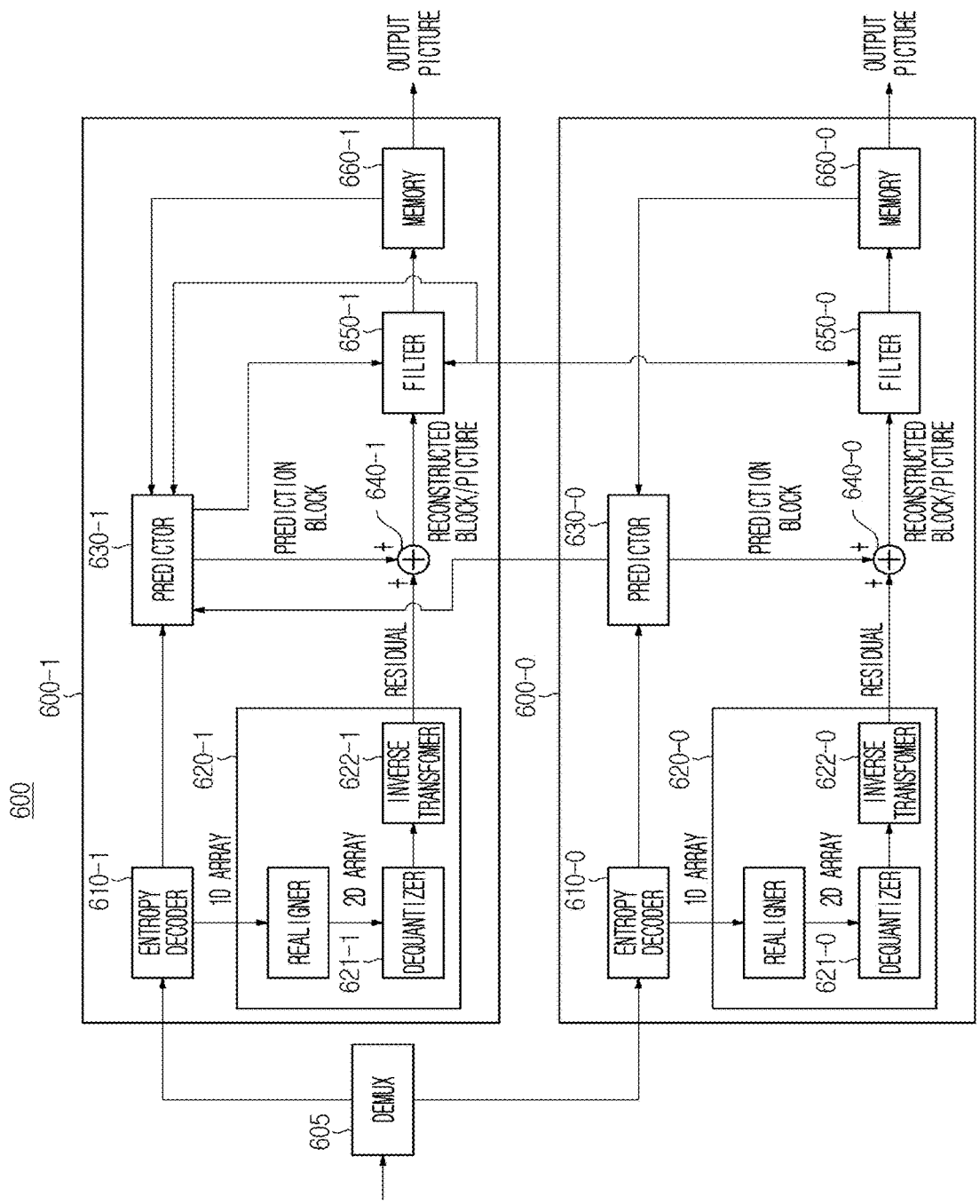
FIG. 6 is a schematic block diagram of a decoding apparatus, to which embodiment(s) of the present disclosure is applicable, and, in which decoding of a multi-layer video/image signal is performed.

FIG. 6 is a schematic block diagram of a decoding apparatus, to which embodiment(s) of the present disclosure is applicable, and, in which decoding of a multi-layer video/image signal is performed. The decoding apparatus of FIG. 6 may include the decoding apparatus of FIG. 3. A realigner shown in FIG. 6 may be omitted or included in a dequantizer. In the description of this drawing, multi-layer based prediction will be focused upon. In addition, the description of the decoding apparatus of FIG. 3 may be included.

In the example of FIG. 6, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 6, the decoding apparatus 600 may include a decoder 600-1 of layer 1 and a decoder 600-0 of layer 1. The decoder 600-1 of layer 1 may include an entropy decoder 610-1, a residual processor 620-1, a predictor 630-1, an adder 640-1, a filter 650-1 and a memory 660-1. The decoder 600-2 of layer 0 may include an entropy decoder 610-0, a residual processor 620-0, a predictor 630-0, an adder 640-0, a filter 650-0 and a memory 660-0.

When a bitstream including image information is received from the encoding apparatus, a DEMUX 605 may demultiplex information for each layer and transmit the information to the decoding apparatus for each layer.

The entropy decoders 610-1 and 610-0 may perform decoding in correspondence with a coding method used in the encoding apparatus. For example, when CABAC is used in the encoding apparatus, the entropy decoders 610-1 and 610-0 may perform entropy decoding using CABAC.

When a prediction mode for a current block is an intra prediction mode, the predictors 630-1 and 630-0 may perform intra prediction for the current block based on neighboring reconstructed samples in the current picture.

When an prediction mode for a current block is an inter prediction mode, the predictors 630-1 and 630-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 630-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 600 may perform inter-layer prediction as described in the multi-layer encoding apparatus 500. For example, the multi-layer decoding apparatus 600 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the multi-layer encoding apparatus 500 and inter-layer prediction applicable in the present disclosure is not limited thereto.

The predictor 630-1 may perform inter-layer prediction using an inter-layer reference picture, when a reference picture index received from the encoding apparatus or a reference picture index derived from a neighboring block indicates an inter-layer reference picture in a reference picture list. For example, the predictor 630-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 630-1 may perform inter prediction for the current block using the inter-layer reference picture.

As described above in the multi-layer encoding apparatus 500, in operation of the multi-layer decoding apparatus 600, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 500, in operation of the multi-layer decoding apparatus 600, a reconstructed picture of a reference layer, from which an inter-layer reference picture is derived, may be a picture belonging to the same AU as a current picture to be encoded.

In addition, as described above in the multi-layer encoding apparatus 500, in operation of the multi-layer decoding apparatus 600, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 500, in operation of the multi-layer decoding apparatus 600, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 500, in operation of the multi-layer decoding apparatus 600, as information on an inter-layer reference picture, only a sample value may be used, only motion information (motion vector) may be used or both a sample value and motion information may be used.

The multi-layer decoding apparatus 600 may receive a reference index indicating an inter-layer reference picture in a reference picture list from the multi-layer encoding apparatus 500 and perform inter-layer prediction based on the same. In addition, the multi-layer decoding apparatus 600 may receive, from the multi-layer encoding apparatus 500, information for specifying which information (sample information, motion information or sample information and motion information) is used from the inter-layer reference picture, that is, information for specifying a dependency type of dependency for inter-layer prediction between two layers.

An image encoding method and decoding method performed by a multi-layer image encoding apparatus and a multi-layer image decoding apparatus according to an embodiment will be described with reference to FIGS. 7 and 8. Hereinafter, for convenience of description, the multi-layer image encoding apparatus may be referred to as an image encoding apparatus. In addition, the multi-layer image decoding apparatus may be referred to as an image decoding apparatus.

Figure 7:
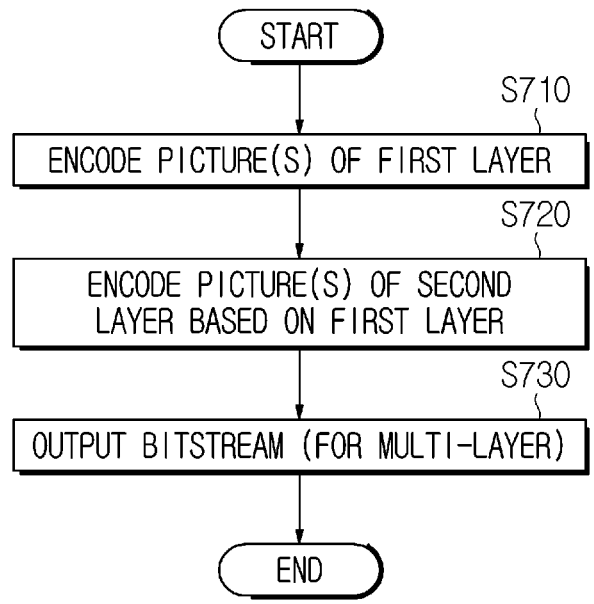
FIG. 7 is a view illustrating a method of encoding an image based on a multi-layer structure by an image encoding apparatus according to an embodiment.

FIG. 7 is a view illustrating a method of encoding an image based on a multi-layer structure by an image encoding apparatus according to an embodiment. The image encoding apparatus according to the embodiment may encode picture(s) of a first layer (S710). Next, the image encoding apparatus may encode picture(s) of a second layer based on the first layer (S720). Next, the image encoding apparatus may output a bitstream (for a multi-layer) (S730).

Figure 8:
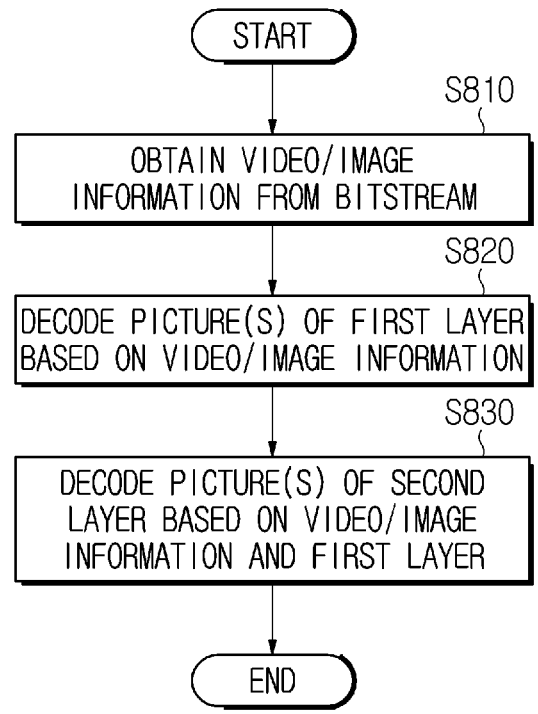
FIG. 8 is a view illustrating a method of decoding an image based on a multi-layer structure by an image decoding apparatus according to an embodiment.

FIG. 8 is a view illustrating a method of decoding an image based on a multi-layer structure by an image decoding apparatus according to an embodiment. The image decoding apparatus according to the embodiment may obtain video/image information from a bitstream (S810). Next, the image decoding apparatus may decode picture(s) of a first layer based on the video/image information (S820). Next, the image decoding apparatus may decode picture(s) of a second layer based on the video/image information and the first layer (S830).

In an embodiment, the video/image information may include high level syntax (HLS) described below. In an embodiment, the HLS may include an SPS and/or a PPS disclosed in the present disclosure. For example, the video/image information may include information and/or syntax elements described in the present disclosure. As described in the present disclosure, the picture(s) of the second layer may be encoded based on motion information/reconstructed samples/parameters of the picture(s) of the first layer. In an embodiment, the layer may be a layer lower than the second layer. In an embodiment, when the second layer is a current layer, the first layer may be referred to as a reference layer.

Video Parameter Set Signaling

Information on a multi-layer may be signaled in a video parameter set (VPS). For example, for a multi-layer bitstream, information on dependency between layers and/or information on an available set of layers which may be decoded may be signaled in the VPS. Here, the available set of the layers which may be decoded may be referred to as an output layer set (OLS). In addition, PTL (Profile, Tier and Level) information, DPB (decoded picture buffer) information and/or HRD(hypothetical reference decoder) information of the OLSs may be signaled in the VPS.

FIG. 9 is a view illustrating an example of VPS syntax including PTL information.

Referring to FIG. 9, the VPS may include a syntax element vps_video_parameter_set_id specifying the identifier of the VPS. The value of vps_video_parameter_set_id may be constrained to be greater than 0.

In addition, the VPS may include vps_max_layers_minus1, vps_max_sublayers_minus1 and vps_all_layers_same_num_sublayers_flag which are syntax elements regarding the number of layers or sublayers.

A value obtained by adding 1 to the syntax element vps_max_layers_minus1 may specify a maximum allowed number of layers in each coded video sequence (CVS) referring to the VPS.

A value obtained by adding 1 to the syntax element vps_max_sublayers_minus1 may specify a maximum number of temporal sublayers which may be present in a layer in each CVS referring to the VPS. In an embodiment, the value of vps_max_sublayers_minus1 may be constrained to be in the range of 0 to 6.

The syntax element vps_all_layers_same_num_sublayers_flag may specify whether the number of temporal sublayers is the same for all layers in each CVS referring to the VPS. For example, vps_all_layers_same_num_sublayers_flag of a first value (e.g., 1) may specify that the number of temporal sublayers is the same for all layers in each CVS referring to the VPS. In contrast, vps_all_layers_same_num_sublayers_flag of a second value (e.g., 0) may specify that the number of temporal sublayers may or may not be the same for all layers in each CVS referring to the VPS. When vps_all_layers_same_num_sublayers_flag is not present, the value of vps_all_layers_same_num_sublayers_flag may be inferred to be a first value (e.g., 1).

In addition, the VPS may include vps_num_ptls_minus1, vps_pt_present_flag[i], vps_ptl_max_temporal_id[i] and vps_ols_ptl_idx[i] which are syntax elements regarding PTL (Profile, Tier and Level).

A value obtained by adding 1 to the syntax element vps_num_ptls_minus1 may specify the number of profile_tier_level( ) syntax structures in the VPS. In an example, the value of vps_num_ptls_minus1 may be constrained to be less than the value of a variable TotalNumOls. Here, TotalNumOls may specify a total number of OLSs specified by the VPS.

The syntax element vps_pt_present_flag[i] may specify whether profile, tier, and general constraint information is present in an i-th profile_tier_level( ) syntax structure in the VPS. For example, vps_pt_present_flag[i] of a first value (e.g., 1) may specify that profile, tier, and general constraint information is present in an i-th profile_tier_level( ) syntax structure in the VPS. In contrast, vps_pt_present_flag[i] of a second value (e.g., 0) may specify that profile, tier, and general constraint information is not present in an i-th profile_tier_level( ) syntax structure in the VPS. When vps_pt_present_flag[i] has a second value (e.g., 0), profile, tier, and general constraint information for the i-th profile_tier_level( ) syntax structure in the VPS may be inferred to be the same as profile, tier, and general constraint information for the (i−1)-th profile_tier_level( ) syntax structure in the VPS. When vps_pt_present_flag[i] is not present, the value of vps_pt_present_flag[i] may be inferred to be a first value (e.g., 1).

The syntax element vps_ptl_max_temporal_id[i] may specify TemporalId of a highest sublayer representation in which level information is present in the i-th profile_tier_level( )syntax structure in the VPS. In an example, the value of vps_ptl_max_temporal_id[i] may be constrained to be in the range of 0 to vps_max_sublayers_minus1. When vps_ptl_max_temporal_id[i] is not present, the value of vps_ptl_max_temporal_id[i] may be inferred to be the same as the value of vps_max_sublayers_minus1.

The syntax element vps_ols_ptl_idx[i] may specify an index for a list of profile_tier level( ) syntax structures in the VPS, of the profile_tier_level( ) syntax structure applied to an i-th OLS. When vps_ols_ptl_idx[i] is present, the value of vps_ols_ptl_idx[i] may be constrained to be in the range of 0 to vps_num_ptls_minus1. When vps_ols_ptl_idx[i] is not present, the value of vps_ols_ptl_idx[i] may be inferred using the following method.

When vps_num_ptls_minus1 is equal to 0, the value of vps_ols_ptl_idx[i] may be inferred to be equal to 0.

In other cases (e.g., when vps_num_ptls_minus1 is greater than 0 and vps_num_tls_minus1+1 is equal to TotalNumOlss), the value of vps_ols_ptl_idx[i] may be inferred to be equal to i.

When NumLayersInOls[i] is equal to 1, the profile_tier_level( ) syntax structure applied to the i-th OLS may also be presented in the SPS referred to by a layer in the i-th OLS. When NumLayersInOls[i] is equal to 1, it may be a requirement for bitstream conformance that profile_tier_level( ) signaled in the VPS and the SPS shall be the same for the i-th OLS.

Each profile_tier_level( ) syntax structure in the VPS may be constrained to be referred to by at least one value of vps_ols_ptl_idx[i]. Here, the value of i may be constrained to be in the range of 0 to TotalNumOlss−1.

Meanwhile, PTL information may be signaled in an SPS (sequence parameter set).

FIG. 10 is a view illustrating an example of SPS syntax including PTL information.

Referring to FIG. 10, the SPS may include a syntax element sps_seq_parameter_set_id specifying the identifier of the SPS and a syntax element sps_video_parameter_set_id specifying the identifier of the VPS referred to by the SPS. When the value of sps_video_parameter_set_id is greater than 0, sps_video_parameter_set_id may specify the value of vps_video_parameter_set_id for the VPS referred to by the SPS.

Presence of the VPS for a single layer bitstream may be optional. When the VPS is not present, the value of sps_video_parameter_set_id may be inferred to be equal to 0. When the value of sps_video_parameter_set_id is equal to 0, the following may be applied.

The SPS does not refer to the VPS, and no VPS is referred to when decoding each CVS referring to the SPS.

The value of vps_max_layers_minus1 is inferred to be equal to 0.

The value of vps_max_sublayers_minus1 is inferred to be equal to 6.

A CVS (coded video sequence) is constrained to include only one layer (that is, all VCL NAL units in the CVS are constrained to have nuh_layer_id of the same value).

The value of GeneralLayerIdx[nuh_layer_id] is inferred to be equal to 0.

The value of vps_independent_layer_flag[GeneralLayerIdx[nuh layer i]] is inferred to be equal to 1.

In addition, the SPS may include a syntax element sps_max_sublayers_minus1 regarding the number of sublayers.

A value obtained by adding 1 to the syntax element sps_max_sublayers_minus1 may specify a maximum number of temporal sublayers which may be present in each CLVS (coded layer video sequence) referring to the SPS.

When the value of sps_video_parameter_set_id is greater than 0, the value of sps_max_sublayers_minus1 may be constrained to be in the range of 0 to vps_max_sublayers_minus1.

In other cases (for example, when the value of sps_video_parameter_set_id is equal to 0), the following may be applied.

The value of sps_max_sublayers_minus1 may be constrained to be in the range of 0 to 6.

The value of vps_max_sublayers_minus1 is inferred to be equal to sps_max_sublayers_minus1.

The value of NumSubLayersInLayerInOLS[0][0] is inferred to be equal to sps_max_sublayers_minus1+1.

The value of vps_ols_ptl_idx[0] is inferred to be equal to 0, and the value (i.e., vps_ptl_max_tid[0]) of vps_ptl_max_tid[vps_ols_ptl_idx[0]] is inferred to be equal to sps_max_sublayers_minus1.

In addition, the SPS may include a syntax element sps_ptl_dpb_hrd_params_present_flag specifying whether predetermined syntax structures including a profile_tier_level( ) syntax structure is present in the SPS. For example, sps_ptl_dpb_hrd_params_present_flag of a first value (e.g., 1) may specify that the profile_tier_level( ) syntax structure and the dpb_parameters( ) syntax structure are present in the SPS and the general_timing_hrd_parameters( ) syntax structure and the ols_timing_hrd_parameters( ) syntax structure may also be present in the SPS. In contrast, sps_ptl_dpb hrd_params_present_flag of a second value (e.g., 0) may specify that all the profile_tier_level( ) syntax structure, the dpb_parameters( ) syntax structure, the general_timing_hrd_parameters( ) syntax structure and the ols_timing_hrd_parameters( ) syntax structure are not present in the SPS.

In an example, when an OLS including only one layer with an sps_video_parameter_set_id value greater than 0 and having the same nuh_layer_id as nuh_layer_id of the SPS is present or when the value of sps_video_ parameter_set_id is equal to 0, sps_ptl_dpb_hrd_params_present flag may be constrained to have a first value (e.g., 1).

Meanwhile, when sps_ptl_dpb_hrd_params_present_flag has a first value (e.g., 1), profile_tier_level(1, sps_max_sublayers_minus1) syntax may be called in the SPS. In this case, a first call input value of profile_tier_level (1, sps_max_sublayers_minus1) syntax may specify whether PTL information is present (e.g., profileTierPresentFlag). In addition, a second call input value of profile_tier_level(1, sps_max_sublayers_minus1) syntax may specify a maximum number (e.g., maxNumSubLayersMinus1) of temporal sublayers which may be present in each CVS.

FIG. 11 is a view illustrating an example of profile_tier_level(profileTierPresentFlag, maxNumSubLayersMinus1) syntax including PTL information.

Referring to FIG. 11, profile_tier_level(profileTierPresentFlag, maxNumSubLayersMinus1) syntax may include syntax elements general_profile_idc, general_tier_flag and general_level_idc regarding general information of PTL (profile, tier, and level). The syntax elements may be signaled/parsed only when PTL information is present (i.e., profileTierPresentFlag==1).

The syntax element general_profile_idc may specify profile information with which OlsInScope complies as specified in Appendix A of the VVC standard. Bitstreams may be constrained not to include values of general_profile_idc other than those specified in Appendix A above. Other values of general_profile_idc may be reserved for future use.

A syntax element general_tier_flag may specify tier context information for analysis of general_level_idc as specified in Appendix A of the VVC standard.

A syntax element general_level_idc may specify level information with which OlsInScope complies as specified in Appendix A of the VVC standard. Bitstreams may be constrained not to include values of general_level_idc other than those specified in Appendix A above. Other values of general_level_idc may be reserved for future use.

In an example, general_level_idc of a larger value may specify a higher level. A maximum level signaled in DCI (Decoding capability information) NAL unit for OlsInScope may be higher than a level signaled in the SPS for the CLVS in OlsInScope but may not be lower than it.

In an example, when OlsInScope complies with multiple profiles, general_profile_idc may be constrained to specify a profile that provides a preferred decoding result or preferred bitstream identification, as determined by an encoder.

In an example, when CVSs of OlsInScope comply with different profiles, since a plurality of profile_tier_level( ) syntax structures may be included in a DCI NAL unit, at least one PTL set specified by a decoder capable of decoding the CVS may be present for each CVS of OlsInScope.

In addition, profile_tier_level(profileTierPresentFlag, maxNumSubLayersMinus1) syntax may include syntax elements ptl_num_sub_profiles and general_sub_profile_idc[i] regarding a sub-profile. When the syntax elements may be signaled/parsed only when PTL information is present (i.e., profileTierPresentFlag==1).

A syntax element ptl_num_sub_profiles may specify the number of general_sub_profile_idc[i] present in profile_tier_level(profileTierPresentFlag, maxNumSubLayersMinus1) syntax.

A syntax element general_sub_profile_idx[i] may specify an indicator of an i-th interoperability metadata.

In addition, profile_tier_level(profileTierPresentFlag, maxNumSubLayersMinus1) syntax may include syntax elements ptl_sublayer_level_present_flag[i] and sublayer_level_idc[i] regarding a sublayer level.

The syntax element ptl_sublayer_level_present_flag[i] may specify whether sublayer level information is present in a profile_tier_level( ) syntax structure for a sublayer representation having TemporalId equal to i. For example, ptl_sublayer_level_present_flag[i] of a first value (e.g., 1) may specify that sublayer level information for an i-th temporal sublayer is present in the profile_tier_level( ) syntax structure. In contrast, ptl_sublayer_level_present_flag[i] of a second value (e.g., 0) may specify that sublayer level information for the i-th temporal sublayer is not present in the profile_tier_level( ) syntax structure. ptl_sublayer_level_present_flag[i] may be signaled/parsed in an ascending order of the value of i, for i from 0 to maxNumSubLayersMinus1−1.

A syntax element sublayer_level_idc[i] may specify a sublayer level index of an i-th temporal sublayer. sublayer_level_idc[i] may be signaled/parsed in an ascending order of i, for i from 0 to maxNumSubLayersMinus1−1. In addition, sublayer_level_idc[i] may be signaled/parsed only when ptl_sublayer_level_present_flag[i] has a first value (e.g., 1).

When sublayer_level_idc[i] is not present, the value of sublayer_level_idc[i] may be inferred as follows.
   sublayer_level_idc[maxNumSubLayersMinus1] may be inferred to be the same value as general_level_idc of the same profile_tier_level( ) syntax structure.
   for i from maxNumSubLayersMinus1−1 to 0 (that is, in a descending order of the value of i), sublayer_level_idc[i] is inferred to be the same value as sublayer_level_idc[i+1].

As described above, presence of sublayer_level_idc[i] may be determined based on the value of ptl_sublayer_level_present_flag[i]. Specifically, when ptl_sublayer_level_present_flag[i] has a first value (e.g., 1), sublayer_level_idc[i] may be signaled/parsed in an ascending order of the value of TemporalId, that is, i. In contrast, when ptl_sublayer_level_present_flag[i] has a second value (e.g., 0), sublayer_level_idc[i] may not be signaled/parsed.

Meanwhile, when sublayer_level_idc[i] is not present, the value of sublayer_level_idc[i] may be inferred to be the same value as a sublayer level index (i.e., sublayer_level_idc [i+1]) of a higher sublayer. That is, signaling/parsing of sublayer_level_idc[i] is performed in an ascending order of the value of i, whereas the inference process (or inference rule) of sublayer_level_idc[i] may be performed in a descending order of the value of i. As a result, when sublayer_level_idc[i+1] is not signaled/parsed, the value of sublayer_level_idc[i] (which is not present in the profile_tier_level( ) syntax structure) may not be inferred. In addition, the inference process may not be performed in the same loop as the signaling/parsing process of sublayer_level_idc[i].

In order to solve such problems, according to the embodiments of the present disclosure, sublayer level information may be signaled/parsed in a descending order from a higher temporal sublayer to a lower temporal sublayer.

FIG. 12 is a view illustrating profile_tier_level(profileTierPresentFlag, maxNumSubLayersMinus1) syntax according to an embodiment of the present disclosure.

Referring to FIG. 12, profile_tier_level(profileTierPresentFlag, maxNumSubLayersMinus1) syntax may include syntax elements ptl_sublayer_level_present_flag[i] and sublayer_level_idc[i] regarding sublayer level information. In an embodiment, the sublayer level information may be signaled/parsed in a descending order from a higher temporal sublayer to a lower temporal sublayer.

The temporal sublayer (or sublayer) may mean a temporal scalable layer of a temporal scalable bitstream consisting VCL NAL units having TemporalId of a specific value and associated non-VCL NAL units.

For inter prediction, a (decoded) picture having TemporalId of a value less than or equal to TemporalId of a current picture may be used as a reference picture.

In an example, TemporalId may be derived by subtracting 1 from the value of nuh_temporal_id_plus1signaled through the NAL unit header of the NAL unit (i.e., TemporalId=nuh_temporal_idplus1−1).

In addition, when nal_unit_type (in the NAL unit header) is in the range of IDR_W_RADL to RSV_IRAP_12, TemporalId may be constrained to be 0. In contrast, when nal_unit_type is equal to STSA_NUT and vps_independent_layer_flag[GeneralLayerIdx[nuh_layer_id]] has a first value (e.g., 1), TemporalId may be constrained to be non-zero. Here, vps_independent_layer_flag[i] may specify whether a layer having an index i may use inter-layer prediction. For example, vps_independent_layer_flag[i] of a first value (e.g., 1) may specify that a layer having an index i may not use inter-layer prediction. In contrast, vps_independent_layer_flag[GeneralLayerIdx[nuh_layer_id]] of a second value (e.g., 0) may specify that a layer having an index i may use inter-layer prediction and a syntax element vps_direct_ref_layer_flag[i][j] (where, 0≤j≤i−1) is present in VPS syntax. vps_independent_layer_flag[i] may be included in the VPS syntax described with reference to FIG. 9 and, when vps_independent_layer_flag[i] is not present in VPS syntax, the value of vps_independent_layer_flag[i] may be inferred to be a first value (e.g., 1).

In addition, the value of TemporalId may be constrained to be the same for all VCL NAL units of one access unit (AU). The value of TemporalId of one coded picture, PU (Picture Unit) or AU may be equal to that of TemporalId of the VCL NAL units of the coded picture, PU or AU. The value of TemporalId of a sublayer representation may be equal to a maximum value of TemporalId of all VCL NAL units in the sublayer representation.

In addition, the value of TemporalId for non-VCL NAL units may be constrained as follows.

When nal_unit_type is equal to DCI_NUT, VPS_NUT or SPS_NUT, the value of TemporalId may be constrained to be 0 and the value of TemporalId of the AU including the NAL unit is also constrained to be 0.

In contrast, when nal_unit_type is equal to PH_NUT, the value of TemporalId is constrained to be equal to that of TemporalId of the PU including the NAL unit.

In contrast, when nal_unit_type is equal to EOS_NUT or EOB_NUT, the value of TemporalId is constrained to be 0.

In contrast, when nal_unit_type is equal to AUD_NUT, FD_NUT, PREFIX_SEI_NUT or SUFFIX_SEI_NUT, the value of TemporalId is constrained to be equal to that of TemporalId of the AU including the NAL unit.

In contrast, when nal_unit_type is equal to PPS_NUT, PREFIX_APS_NUT or SUFFIX_APS_NUT, the value of TemporalId is constrained to be greater than or equal to that of TemporalId of the PU including the NAL unit.

In an example, when the NAL unit is a non-VCL NAL unit, the value of TemporalId may be equal to a minimum value of the TemporalId value of all AUs to which a non-VCL NAL unit is applied. When nal_unit_type is equal to PPS_NUT, PREFIX_APS_NUT or SUFFIX_APS_NUT, the value of TemporalId may be greater than or equal to that of TemporalId of the AU including the NAL unit. This is because all PPSs and APSs may be included in the beginning of a bitstream (e.g., this information is transmitted out-of-band and a receiver places it in the beginning of the bitstream). Here, a first coded picture may have TemporalId having a value equal to 0.

A syntax element ptl_sublayer_level_present_flag[i] may specify whether sublayer level information is present in a profile_tier_level( ) syntax structure (e.g., "1": presence and "0": absence) for the sublayer representation (that is, the i-th temporal sublayer) having TemporalId equal to i.

In an embodiment, ptl_sublayer_level_present_flag[i] may be signaled/parsed in a descending order of the value of TemporalId, that is, i. More specifically, ptl_sublayer_level_present_flag[i] may be signaled/parsed in order of a second highest temporal sublayer (i.e., i=maxNumSubLayersMinus1−1) to a first temporal sublayer (i.e., i=0).

A syntax element sublayer_level_idc[i] may specify a sublayer level index of an i-th temporal sublayer.

The semantics of the syntax element sublayer_level_idc[i] are equal to general_level_idc except for the inference process (or inference rule) when the value is absent, but is applicable to the sublayer representation having TemporalId equal to i.

In an embodiment, sublayer_level_idc[i] may be signaled/parsed in a descending order of the value of TemporalId, that is, i. More specifically, sublayer_level_idc[i] may be signaled in order of a second highest temporal sublayer (i.e., i=maxNumSubLayersMinus1−1) to a first temporal sublayer (i.e., i=0). In addition, sublayer_level_idc[i] may be signaled/parsed only when ptl_sublayer_level_present_flag[i] has a first value (e.g., 1). The value of sublayer_level_idc[maxNumSubLayersMinus1] may be inferred to be a value equal to general_level_idc of the same profile_tier_level( ) syntax structure.

When sublayer_level_idc[i] is not present, the value of sublayer_level_idc[i] (where, 0≤i≤maxNumSubLayersMinus1−1) may be inferred to be the same value as sublayer_level_idc[i+1].

Meanwhile, in a performance evaluation simulation process, in order to compare tier capabilities, a tier (i.e., main tier) having general_tier_flag of a second value (e.g., 0) may be regarded as a lower tier than a tier (i.e., higher tier) having general_tier_flag of a first value (e.g., 1). In addition, in order to compare level capabilities, when the value of general_level_idc or sublayer_level_idc[i] at a specific level is less than a value at another level, the specific level of a predetermined tier may be regarded as being lower than the other level of the tier.

As described above, according to embodiments of the present disclosure, signaling/parsing of ptl_sublayer_level_present_flag[i] may be performed in a descending order of the value of TemporlId, that is, i. Similarly, signaling/parsing and inference process (or inference rule) of sublayer_level_idc[i] may also be performed in a descending order of the value of i. That is, sublayer_level_idc[i+1] may be signaled/parsed before sublayer_level_idc[i]. Therefore, the inference process of the value of sublayer_level_idc[i] may be performed in the same loop as the signaling/parsing process of sublayer_level_idc[i].

Hereinafter, an image encoding/decoding method according to an embodiment of the present disclosure will be described in detail with reference to FIGS. 13 and 14.

Figure 13:
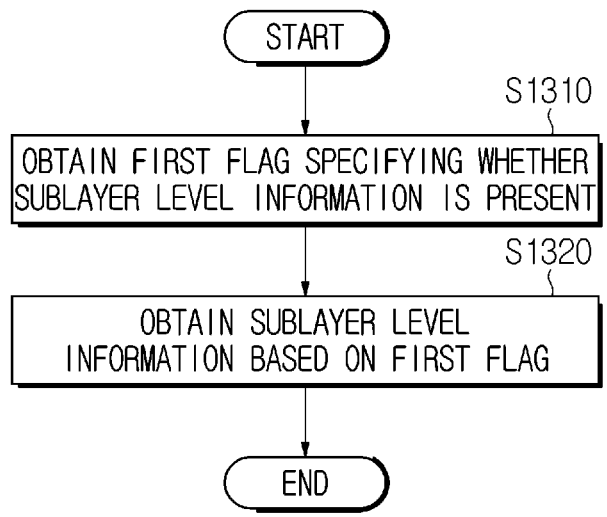
FIG. 13 is a flowchart illustrating an image encoding method according to an embodiment of the present disclosure.

FIG. 13 is a flowchart illustrating an image encoding method according to an embodiment of the present disclosure.

The image encoding method of FIG. 13 may be performed by the image encoding apparatus of FIG. 2 or 5. For example, step S1310 and step S1320 may be performed by the entropy encoder 190, 740-0 or 740-1.

Referring to FIG. 13, the image encoding apparatus may encode a first flag specifying whether sublayer level information is present for each of one or more sublayers in a current layer (S1310). The first flag may mean ptl_sublayer_level_present_flag[i] in profile_tier_level(profileTierPresentFlag, maxNumSubLayersMinus1) syntax described above with reference to FIG. 12. In addition, the sublayer level information may mean sublayer_level idc[i] in profile_tier_level(profileTierPresentFlag, maxNumSubLayersMinus1) syntax described above with reference to FIG. 12.

In an embodiment, the first flag (e.g., ptl_sublayer_level_present_flag[i]) may be encoded in a descending order of the temporal identifier values for the one or more sublayers. The temporal identifier values may be derived by subtracting 1 from the value of nuh_temporal_id_plus1 signaled through the NAL unit header (i.e., TemporalId=nuh_temporal_id_plus1−1).

In an embodiment, the first flag may be encoded based on a maximum number (e.g., maxNumSubLayersMinus1) of sublayers in the current layer. For example, as described above with reference to FIG. 12, ptl_sublayer_level_present_flag[i] may be encoded/signaled from a second highest temporal sublayer (i.e., i=maxNumSubLayersMinus1−1) to a first temporal sublayer (i.e., i=0).

The image encoding apparatus may encode the sublayer level information based on the first flag (S1320). For example, as described above with reference to FIG. 12, only when ptl_sublayer_level_present_flag[i] has a first value (e.g., 1) specifying that the sublayer level information is present, sublayer_level_idc[i] may be encoded/signaled.

In an embodiment, the sublayer level information (e.g., sublayer_level_idc[i]) may be encoded in a descending order of the temporal identifier values.

In an embodiment, the sublayer level information may be encoded based on a maximum number of sublayers in the current layer. For example, as described above with reference to FIG. 12, sublayer_level_idc[i] may be encoded/signaled in order of a second highest temporal sublayer (i.e., i=maxNumSubLayersMinus1−1) to a first temporal sublayer (i.e., i=0).

Figure 14:
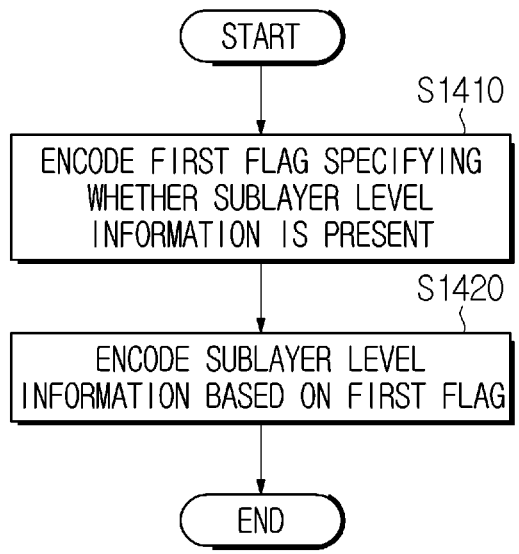
FIG. 14 is a flowchart illustrating an image decoding method according to an embodiment of the present disclosure.

FIG. 14 is a flowchart illustrating an image decoding method according to an embodiment of the present disclosure.

The image decoding method of FIG. 14 may be performed by the image decoding apparatus of FIG. 3 or 5. For example, step S1410 to step S1420 may be performed by the entropy decoder 210, 810-0 or 810-1.

Referring to FIG. 14, the image decoding apparatus may obtain (or decode), from a bitstream, a first flag specifying whether sublayer level information is present for each of one or more sublayers in a current layer (S1410).

In an embodiment, the first flag (e.g., ptl_sublayer_level_present_flag[i]) may be obtained in a descending order of the temporal identifier values for the one or more sublayers. The temporal identifier values may be derived by subtracting 1 from the value of nuh_temporal_id_plus1 signaled through the NAL unit header (i.e., TemporalId=nuh_temporal_id_plus1−1).

In an embodiment, the first flag may be obtained based on a maximum number (e.g., maxNumSubLayersMinus1) of sublayers in the current layer. For example, as described above with reference to FIG. 12, ptl_sublayer_level_present_flag[i] may be decoded/signaled from a second highest temporal sublayer (i.e., i=maxNumSubLayersMinus1−1) to a first temporal sublayer (i.e., i=0).

The image decoding apparatus may decode (or decode) the sublayer level information from the bitstream based on the first flag (S1420). For example, as described above with reference to FIG. 12, only when ptl_sublayer_level_present_flag[i] has a first value (e.g., 1) specifying that the sublayer level information is present, sublayer_level_idc[i] may be decoded/parsed.

In an embodiment, the sublayer level information (e.g., sublayer_level_idc[i]) may be obtained in a descending order of the temporal identifier values.

In an embodiment, the sublayer level information may be obtained based on a maximum number of sublayers in the current layer. For example, as described above with reference to FIG. 12, sublayer_level_idc[i] may be decoded/parsed in order of a second highest temporal sublayer (i.e., i=maxNumSubLayersMinus1−1) to a first temporal sublayer (i.e., i=0).

In an embodiment, based on the first flag (e.g., ptl_sublayer_level_present_flag[i]) specifying that first sublayer level information (e.g., sublayer_level_idc[i]) of a first sublayer in the current layer is not present, obtaining of the first sublayer level information may be skipped. In this case, the first sublayer level information may be set (or inferred) to the same value as second sublayer level information (e.g., sublayer_level_idc[i+1]) of a second sublayer having a second temporal identifier value greater than a first temporal identifier value of the first sublayer by 1.

In an embodiment, third sublayer level information of a third sublayer having a largest temporal identifier value among the one or more sublayers may be set (or inferred) to the same value as general level index information (e.g., general_level_idc) preset for one or more OLSs. Here, the general level index information may specify a level with which one or more OLSs specified by a video parameter set (VPS) comply. In an example, general_level_idc of a larger value may specify a higher level.

As described above, according to the image encoding/decoding method according to an embodiment of the present disclosure described above with reference to FIGS. 13 and 14, the first flag (e.g., ptl_sublayer_level_present_flag[i]) specifying whether sublayer level information is present for each of one or more sublayers in the current layer may be obtained in a descending order of temporal identifier values for the one more sublayers. Similarly, the sublayer level information (e.g., sublayer_level_idc[i]) may also be obtained in a descending order of the temporal identifier values. Therefore, the inference process of the sublayer level information may be performed in the same loop as the signaling/parsing process of the sublayer level information.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 15:
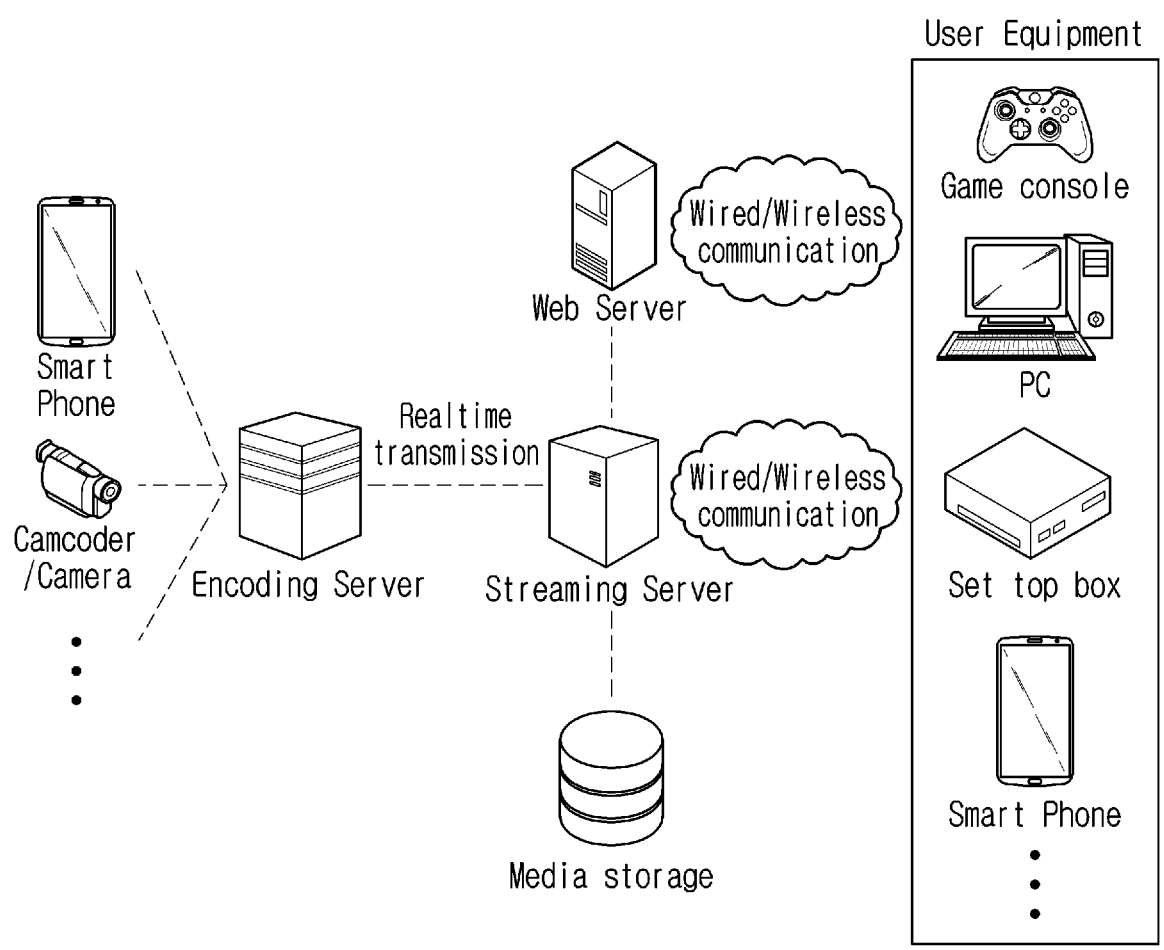
FIG. 15 is a view illustrating a content streaming system, to which an embodiment of the present disclosure is applicable.

FIG. 15 is a view showing a content streaming system, to which an embodiment of the present disclosure is applicable.

As shown in FIG. 15, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding method performed by an image decoding apparatus, the image decoding method comprising:
obtaining, from a bitstream, a first flag specifying whether sublayer level information is present for each of one or more sublayers in a current layer; and
obtaining, from the bitstream, the sublayer level information based on the first flag,
wherein the first flag is obtained in a descending order of temporal identifier values for the one or more sublayers.

2. The image decoding method of claim 1, wherein the sublayer level information is obtained in the descending order of the temporal identifier values.

3. The image decoding method of claim 1, wherein the first flag and the sublayer level information are obtained based on a maximum number of sublayers in the current layer.

4. The image decoding method of claim 1, wherein, based on the first flag specifying that first sublayer level information of a first sublayer in the current layer is not present,
obtaining of the first sublayer level information is skipped, and the first sublayer level information is set to the same value as second sublayer level information of a second sublayer having a second temporal identifier value greater than a first temporal identifier value of the first sublayer by 1.

5. The image decoding method of claim 1, wherein third sublayer level information of a third sublayer having a largest temporal identifier value among the one or more sublayers is set to the same value as general level index information preset for one or more output layer sets.

6. An image decoding apparatus comprising:
a memory; and
at least one processor,
wherein the at least one processor is configured to:
obtain, from a bitstream, a first flag specifying whether sublayer level information is present for each of one or more sublayers in a current layer; and
obtain, from the bitstream, the sublayer level information based on the first flag,
wherein the first flag is obtained in a descending order of temporal identifier values for the one or more sublayers.

7. An image encoding method performed by an image encoding apparatus, the image encoding method comprising:
encoding a first flag specifying whether sublayer level information is present for each of one or more sublayers in a current layer; and
encoding the sublayer level information based on the first flag,
wherein the first flag is encoded in a descending order of temporal identifier values for the one or more sublayers.

8. The image encoding method of claim 7, wherein the sublayer level information is encoded in the descending order of the temporal identifier values.

9. The image encoding method of claim 7, wherein the first flag and the sublayer level information are encoded based on a maximum number of sublayers in the current layer.

10. A non-transitory computer-readable recording medium storing a bitstream generated by the image encoding method of claim 7.

* * * * *